United States Patent
Liu et al.

(10) Patent No.: US 10,992,406 B2
(45) Date of Patent: Apr. 27, 2021

(54) COMMUNICATION IN PASSIVE OPTICAL NETWORKS (PONS) RELATED TO DIGITAL SIGNAL PROCESSING FOR OPTICAL SIGNAL (ODSP)

(71) Applicant: HUAWEI TECHNOLOGIES CO., LTD., Shenzhen (CN)

(72) Inventors: Xiang Liu, Marlboro, NJ (US); Yuanqiu Luo, Cranbury, NJ (US); Huaiyu Zeng, Red Bank, NJ (US); Andy Shen, Morganville, NJ (US); Frank Effenberger, Frisco, TX (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/024,466

(22) Filed: Sep. 17, 2020

(65) Prior Publication Data

US 2021/0006346 A1    Jan. 7, 2021

Related U.S. Application Data

(63) Continuation of application No. PCT/CN2019/091447, filed on Jun. 16, 2019.

(60) Provisional application No. 62/808,008, filed on Feb. 20, 2019.

(51) Int. Cl.
| | |
|---|---|
| *H04B 10/00* | (2013.01) |
| *H04J 14/02* | (2006.01) |
| *H04B 10/556* | (2013.01) |
| *H04J 14/00* | (2006.01) |

(52) U.S. Cl.
CPC .......... *H04J 14/023* (2013.01); *H04B 10/556* (2013.01); *H04J 14/0267* (2013.01)

(58) Field of Classification Search
CPC .. H04B 10/27; H04B 10/272; H04B 10/2725; H04J 14/0227; H04J 14/0272; H04J 14/0273; H04J 14/086
See application file for complete search history.

(56) References Cited

U.S. PATENT DOCUMENTS

| | | | |
|---|---|---|---|
| 2018/0302183 A1* | 10/2018 | Liu | H04J 14/0234 |
| 2020/0076629 A1* | 3/2020 | Pandey | H04L 69/323 |
| 2020/0287651 A1* | 9/2020 | Jafari | H04B 10/548 |

* cited by examiner

*Primary Examiner* — Daniel G Dobson
(74) *Attorney, Agent, or Firm* — Conley Rose, P.C.

(57) ABSTRACT

A first apparatus in an optical communications network, the first apparatus comprises a transmitter; a receiver; a first MAC; and a first oDSP coupled to the transmitter, the receiver, and the first MAC and configured to communicate a message via a dedicated C&M channel with at least one of the first MAC, a second MAC in a second apparatus in the optical communications network, or a second oDSP in the second apparatus. A method comprises receiving an FS message comprising a PLOAM field, the PLOAM field contains oDSP-related C&M information, and the oDSP-related C&M information comprises a message type ID field and a Message_Content field; reading the message type ID field; and deciding, based on the message type ID field, whether to read the Message_Content field.

20 Claims, 8 Drawing Sheets

PLOAMd FIELD
300

| OCTET | FIELD | DESCRIPTION |
|---|---|---|
| 1-2 | ONU-ID | DIRECTED MESSAGE TO ONE ONU OR BROADCAST MESSAGE TO ALL ONUs. AS A BROADCAST TO ALL ONUs, ONU-ID = 0x03FF. |
| 3 | MESSAGE TYPE ID | XX, "oDSP-RELATED DOWNSTREAM MESSAGE" |
| 4 | SeqNo | SEQUENCE NUMBER |
| 5-40 | MESSAGE_CONTENT | INFORMATION PASSED FROM OLT TO ONUs ON oDSP-RELATED CONTROL AND MANAGEMENT |
| 41-48 | MIC | MESSAGE INTEGRITY CHECK |

| MESSAGE TYPE ID | SOURCE | DESTINATION | VACATION |
|---|---|---|---|
| 01 | MAC 105 | oDSP 107 | AFTER BEING READ BY oDSP 107 |
| 02 | MAC 105 | oDSPs 137, 153 | |
| 03 | MAC 105 | MACs 140, 155 | |
| 04 | MAC 105 | oDSPs 107, 137, 153 | |
| 05 | MAC 105 | oDSP 107 AND MACs 140, 155 | |
| 06 | MAC 105 | oDSPs 137, 153 AND MACs 140, 155 | |
| 07 | MAC 105 | oDSPs 107, 137, 153 AND MACs 140,155 | |
| 08 | oDSP 107 | oDSPs 137, 153 | |
| 09 | oDSP 107 | MACs 140, 155 | |
| 10 | oDSP 107 | oDSPs 137, 153 AND MACs 140, 155 | |
| 11 | oDSPs 137,153 | MACs 140, 155 | |

| OCTET | FIELD | DESCRIPTION |
|---|---|---|
| 1-2 | ONU-ID | ONU-ID OF THE MESSAGE SENDER |
| 3 | MESSAGE TYPE ID | YY, "oDSP-RELATED UPSTREAM MESSAGE" |
| 4 | SeqNo | SEQUENCE NUMBER |
| 5-40 | MESSAGE_CONTENT | INFORMATION PASSED FROM ONU TO OLT ON oDSP-RELATED CONTROL AND MANAGEMENT |
| 41-48 | MIC | MESSAGE INTEGRITY CHECK |

| MESSAGE TYPE ID | SOURCE | DESTINATION | VACATION |
|---|---|---|---|
| 01 | MACs 140, 155 | oDSPs 137, 153 | AFTER BEING READ BY oDSPs 137, 153 |
| 02 | MACs 140, 155 | oDSP 107 | |
| 03 | MACs 140, 155 | MAC 105 | |
| 04 | MACs 140, 155 | oDSPs 107, 137, 153 | |
| 05 | MACs 140, 155 | MAC 105 AND oDSPs 137, 153 | |
| 06 | MACs 140, 155 | MAC 105 AND oDSP 107 | |
| 07 | MACs 140, 155 | MAC 105 AND oDSPs 107, 137, 153 | |
| 08 | oDSPs 137, 153 | oDSP 107 | |
| 09 | oDSPs 137, 153 | MAC 105 | |
| 10 | oDSPs 137, 153 | MAC 105 AND oDSP 107 | |
| 11 | oDSP 107 | MAC 105 | |

FIG. 7

COMMUNICATION IN PASSIVE OPTICAL NETWORKS (PONS) RELATED TO DIGITAL SIGNAL PROCESSING FOR OPTICAL SIGNAL (ODSP)

CROSS-REFERENCE TO RELATED APPLICATIONS

This is a continuation of Int'l Patent App. No. PCT/CN2019/091447 filed on Jun. 16, 2019, which claims priority to U.S. Prov. Patent App. No. 62/808,008 filed on Feb. 20, 2019, both of which are incorporated by reference.

TECHNICAL FIELD

The disclosed embodiments relate to optical communications networks in general and communication in PONs related to oDSP in particular.

BACKGROUND

Optical communications networks are networks that use light waves, or optical signals, to carry data. Light sources such as lasers generate optical signals; modulators modulate the optical signals with data to generate modulated optical signals; and various components transmit, propagate, amplify, receive, and process the modulated optical signals. Optical communications networks implement WDM and other forms of multiplexing to achieve high bandwidths. Optical communications networks implement data centers, metropolitan networks, PONs, longhauls, and other applications.

SUMMARY

A first aspect relates to a first apparatus in an optical communications network, the first apparatus comprising a transmitter; a receiver; a first MAC; and a first oDSP coupled to the transmitter, the receiver, and the first MAC and configured to communicate a message via a dedicated C&M channel with at least one of the first MAC, a second MAC in a second apparatus in the optical communications network, or a second oDSP in the second apparatus.

In a first implementation form of the method according to the first aspect as such, the optical communications network is a PON, wherein the first apparatus is an OLT, and wherein the second apparatus is an ONU.

In a second implementation form of the method according to the first aspect as such or any preceding implementation form of the first aspect, the optical communications network is a PON, wherein the first apparatus is an ONU, and wherein the second apparatus is an OLT.

In a third implementation form of the method according to the first aspect as such or any preceding implementation form of the first aspect, the dedicated C&M channel is a PLOAM channel.

In a fourth implementation form of the method according to the first aspect as such or any preceding implementation form of the first aspect, the first oDSP is further configured to generate the message; and transmit the message to the first MAC.

In a fifth implementation form of the method according to the first aspect as such or any preceding implementation form of the first aspect, the first oDSP is further configured to generate the message, and wherein the transmitter is configured to transmit the message to at least one of the second MAC or the second oDSP.

In a sixth implementation form of the method according to the first aspect as such or any preceding implementation form of the first aspect, the first oDSP is further configured to receive the message; and process the message.

In a seventh implementation form of the method according to the first aspect as such or any preceding implementation form of the first aspect, the message is a C&M message that implements oDSP-related C&M.

In an eighth implementation form of the method according to the first aspect as such or any preceding implementation form of the first aspect, the first oDSP is further configured to communicate a CMM indicating the dedicated C&M channel.

In a ninth implementation form of the method according to the first aspect as such or any preceding implementation form of the first aspect, the message is a C&M message, and wherein the CMM indicates the C&M message will follow, when in time the C&M message will follow, and how large the C&M message will be.

In a tenth implementation form of the method according to the first aspect as such or any preceding implementation form of the first aspect, the CMM is in an idle frame.

In an eleventh implementation form of the method according to the first aspect as such or any preceding implementation form of the first aspect, the CMM further indicates the idle frame.

A second aspect relates to a method comprising receiving an FS message comprising a PLOAM field, the PLOAM field contains oDSP-related C&M information, and the oDSP-related C&M information comprises a message type ID field and a Message_Content field; reading the message type ID field; and deciding, based on the message type ID field, whether to read the Message_Content field.

In a first implementation form of the method according to the second aspect as such, the method further comprises removing the Message_Content field to create a modified PLOAM field; and transmitting the modified PLOAM field.

In a second implementation form of the method according to the second aspect as such or any preceding implementation form of the second aspect, the PLOAM field is a PLOAMd field from a MAC in an OLT to an oDSP in the OLT, and wherein the modified PLOAM field is a modified PLOAMd field from the OLT to an ONU.

In a third implementation form of the method according to the second aspect as such or any preceding implementation form of the second aspect, the PLOAM field is a PLOAMu field from a MAC in an ONU to an oDSP in the ONU, and wherein the modified PLOAM field is a modified PLOAMu field from the ONU to an OLT.

A third aspect relates to an apparatus comprising a memory; and a processor coupled to the memory and configured to perform any of the second aspect as such or any preceding implementation form of the second aspect.

A fourth aspect relates to a computer program product comprising computer-executable instructions stored on a non-transitory medium that when executed by a processor cause an apparatus to perform any of the second aspect as such or any preceding implementation form of the second aspect.

A fifth aspect relates to a method comprising generating a downstream FS frame comprising an FS header, the FS header comprises a PLOAMd field, the PLOAMd field implements oDSP-related control and management in an optical communications network, and the PLOAMd field comprises an ONU-ID field, a message type ID field, a SeqNo field, a Message_Content field, and an MIC field; and transmitting the downstream FS frame.

A sixth aspect relates to an apparatus comprising a memory; and a processor coupled to the memory and configured to perform any of the fifth aspect as such or any preceding implementation form of the fifth aspect.

A seventh aspect relates to a computer program product comprising computer-executable instructions stored on a non-transitory medium that when executed by a processor cause an apparatus to perform any of the fifth aspect as such or any preceding implementation form of the fifth aspect.

An eighth aspect relates to a method comprising receiving a downstream FS frame comprising an FS header, the FS header comprises a PLOAMd field, the PLOAMd field implements oDSP-related control and management in an optical communications network, and the PLOAMd field comprises an ONU-ID field, a message type ID field, a SeqNo field, a Message_Content field, and an MIC field; and processing the downstream FS frame.

A ninth aspect relates to an apparatus comprising a memory; and a processor coupled to the memory and configured to perform any of the eighth aspect as such or any preceding implementation form of the eighth aspect.

A tenth aspect relates to a computer program product comprising computer-executable instructions stored on a non-transitory medium that when executed by a processor cause an apparatus to perform any of the eighth aspect as such or any preceding implementation form of the eighth aspect.

An eleventh aspect relates to a method comprising generating an upstream FS burst comprising an FS header, the FS header comprises a PLOAMu field, the PLOAMu field implements oDSP-related control and management in an optical communications network, and the PLOAMu field comprises an ONU-ID field, a message type ID field, a SeqNo field, a Message_Content field, and an MIC field; and transmitting the upstream FS burst.

A twelfth aspect relates to an apparatus comprising a memory; and a processor coupled to the memory and configured to perform any of the eleventh aspect as such or any preceding implementation form of the eleventh aspect.

A thirteenth aspect relates to a computer program product comprising computer-executable instructions stored on a non-transitory medium that when executed by a processor cause an apparatus to perform any of the eleventh aspect as such or any preceding implementation form of the eleventh aspect.

A fourteenth aspect relates to a method comprising receiving an upstream FS burst comprising an FS header, the FS header comprises a PLOAMu field, the PLOAMu field implements oDSP-related control and management in an optical communications network, and the PLOAMu field comprises an ONU-ID field, a message type ID field, a SeqNo field, a Message_Content field, and an MIC field; and processing the upstream FS burst.

A fifteenth aspect relates to an apparatus comprising a memory; and a processor coupled to the memory and configured to perform any of the fourteenth aspect as such or any preceding implementation form of the fourteenth aspect.

A sixteenth aspect relates to a computer program product comprising computer-executable instructions stored on a non-transitory medium that when executed by a processor cause an apparatus to perform any of the fourteenth aspect as such or any preceding implementation form of the fourteenth aspect.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a PLOAMd field according to an embodiment of the disclosure.

FIG. 4 is a table of downstream C&M messages according to an embodiment of the disclosure.

FIG. 6 is a PLOAMu field according to an embodiment of the disclosure.

FIG. 7 is a table of upstream C&M messages according to an embodiment of the disclosure.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:

AGC: automatic gain control
Alloc-ID: allocation ID
ASIC: application-specific integrated circuit
BCH: Bose-Chaudhuri-Hocquenghem
BER: bit error ratio
BIP: bit-interleaved parity
BufOcc: buffer occupancy
BWmap: bandwidth map
CMM: C&M marker CPU: central processing unit
CRC: cyclic redundancy check
C&M: control and management
DBA: dynamic bandwidth assignment
DBRu: dynamic bandwidth report, upstream
DSP: digital signal process(ing, or)
EO: electrical-to-optical
FEC: forward error correction
FPGA: field-programmable gate array
FS: framing sublayer
FWI: forced wake-up indication
HEC: hybrid error correction
HLend: header length, downstream
ID: identifier
Ind: indication (format field)
MAC: media access control(ler)
MIC: message integrity check
NRZ: non-return-to-zero
oDSP: DSP for optical signal
OE: optical-to-electrical
OLT: optical line terminal
ONU: optical network unit
PAM: pulse-amplitude modulation
PHY: physical interface
PLOAM: physical layer operations, administration, and maintenance
PLOAMd: PLOAM, downstream
PLOAMu: PLOAM, upstream
PON: passive optical network
PRBS: pseudorandom binary sequence
RAM: random-access memory
RF: radio frequency
ROM: read-only memory
RX: receiver unit
SDU: service data unit
SeqNo: sequence number
SRAM: static RAM
TCAM: ternary content-addressable memory
TX: transmitter unit
WDM: wavelength-division multiplex(er, ing)
μs: microsecond(s).

Figure 1:
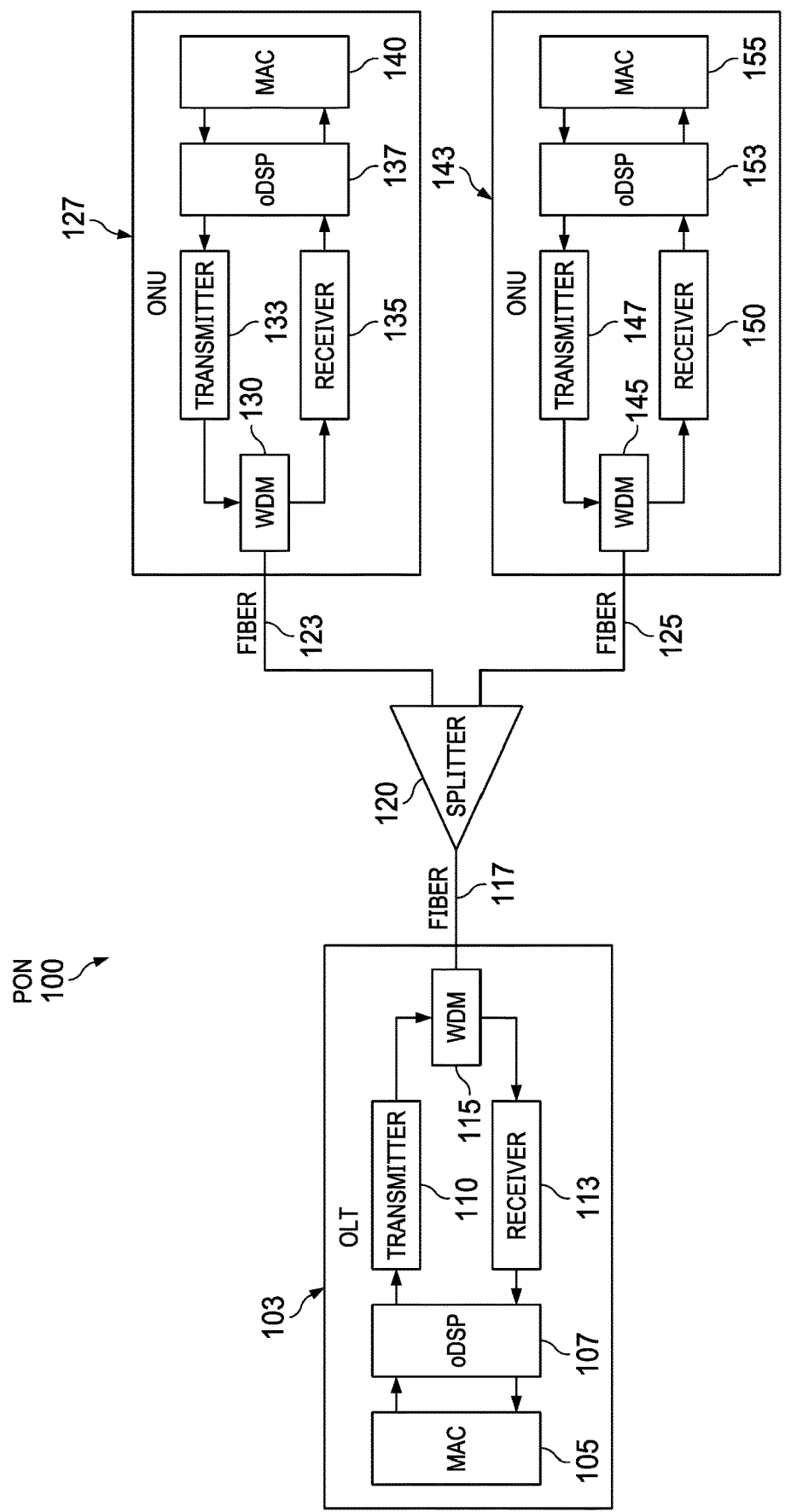
FIG. 1 is a schematic diagram of a PON.

FIG. 1 is a schematic diagram of a PON 100. The PON 100 comprises an OLT 103; fibers 117, 123, 125; a splitter 120; and ONUs 127, 143. The PON 100 is an optical communications network that may not require active components to distribute data between the OLT 103 and the ONUs 127, 143. Instead, the PON 100 may use passive optical components to distribute data between the OLT 103 and the ONUs 127, 143. A downstream direction is from the OLT 103 to the ONUs 127, 143, and an upstream direction is from the ONUs 127, 143 to the OLT 103. Though two ONUs 127, 143 are shown, the PON 100 may comprise any number of ONUs.

The OLT 103 comprises a MAC 105, an oDSP 107, a transmitter 110, a receiver 113, and a WDM 115. The ONU 127 comprises a WDM 130, a transmitter 133, a receiver 135, an oDSP 137, and a MAC 140. The ONU 143 comprises a WDM 145, a transmitter 147, a receiver 150, an oDSP 153, and a MAC 155. The transmitters 110, 133, 147 may comprise lasers. The receivers 113, 135, 150 may comprise photodiodes.

In operation, in the downstream direction, the OLT 103 transmits optical signals that both ONUs 127, 143 receive. Some optical signals are intended for the ONU 127, some optical signals are intended for the ONU 143, and some optical signals are intended for both ONUs 127, 143. Thus, the ONUs 127, 143 may process only the optical signals intended for them. Specifically, in the OLT 103, the MAC 105 obtains user data, organizes the user data into a frame structure as a digital electrical signal and provides instructions to the oDSP 107 on how to perform equalization. The oDSP 107 converts the digital electrical signal into an analog electrical signal and equalizes the analog electrical signal based on the instructions from the MAC 105. The transmitter 110 generates an optical signal based on the analog electrical signal. The WDM 115 transmits the optical signal to the fiber 117, the splitter 120, the fiber 123 and the ONU 127, and the fiber 125 and the ONU 143. In the ONU 127, the WDM 130 transmits the optical signal to the receiver 135. The receiver 135 converts the optical signal into an analog electrical signal. The oDSP 137 performs equalization on the analog electrical and converts the analog electrical signal into a digital electrical signal. Finally, the MAC 140 parses the digital electrical signal to obtain and provide user data. The ONU 143 functions in a manner similar to the ONU 127.

In the upstream direction, the ONUs 127, 143 transmit optical signals as bursts that the splitter 120 combines into a single optical signal for the OLT 103. Specifically, in the ONU 127, the MAC 140 obtains user data, organizes the user data into a frame structure as a digital electrical signal and provides instructions to the oDSP 137 on how to perform equalization. The oDSP 137 converts the digital electrical signal into an analog electrical signal and equalizes the analog electrical signal based on the instructions from the MAC 140. The transmitter 133 generates an optical signal based on the analog electrical signal. The WDM 130 transmits the optical signal to the fiber 123, the splitter 120, the fiber 117, and the OLT 103. The ONU 143 functions in a manner similar to the ONU 127. In the OLT 103, the WDM 115 transmits the optical signal to the receiver 113. The receiver 113 converts the optical signal into an analog electrical signal. The oDSP 107 performs equalization on the analog electrical and converts the analog electrical signal into a digital electrical signal. Finally, the MAC 105 parses the digital electrical signal to obtain and provide user data.

The oDSPs 107, 137, 153 are relatively new components, so their functions are not well defined. For instance, it is desirable for the oDSPs 107, 137, 153 to communicate oDSP information to the MACs 105, 140, 155 and for the MACs 105, 140, 155 to communicate oDSP information to the oDSPs 107, 137, 153. However, there currently lacks techniques for such communication.

Disclosed herein are embodiments for communication in PONs related to oDSP. The embodiments provide for such communication via CMMs and C&M messages. The CMMs indicate that C&M messages will follow, when in time the C&M messages will follow, and how large the C&M messages will be. The CMMs may also indicate C&M channels or dedicated C&M channels. The C&M messages provide information that improves performance of oDSPs and MACs in the PONs. An OLT and ONUs in the PONs communicate the CMMs and the C&M messages between each other in a number of different manners.

Figure 2B:
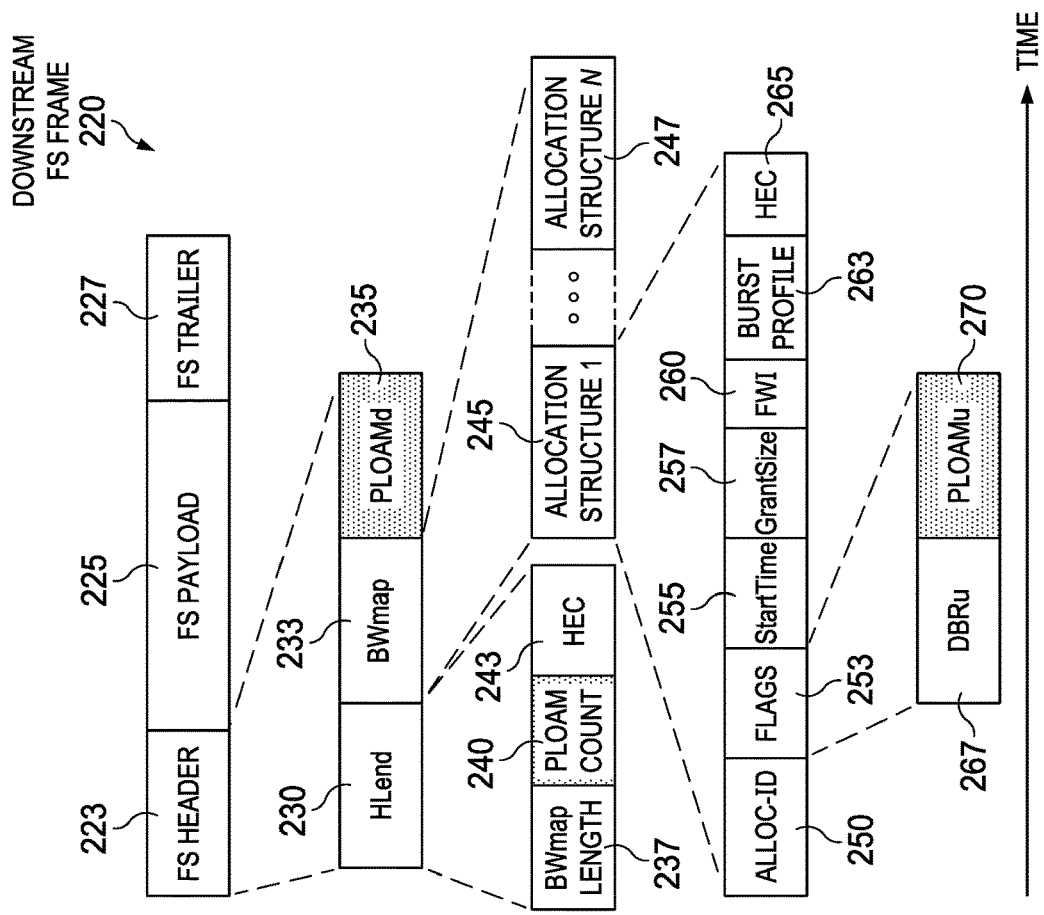
FIG. 2B is a schematic diagram of a downstream FS frame according to another embodiment of the disclosure.
Figure 2A:
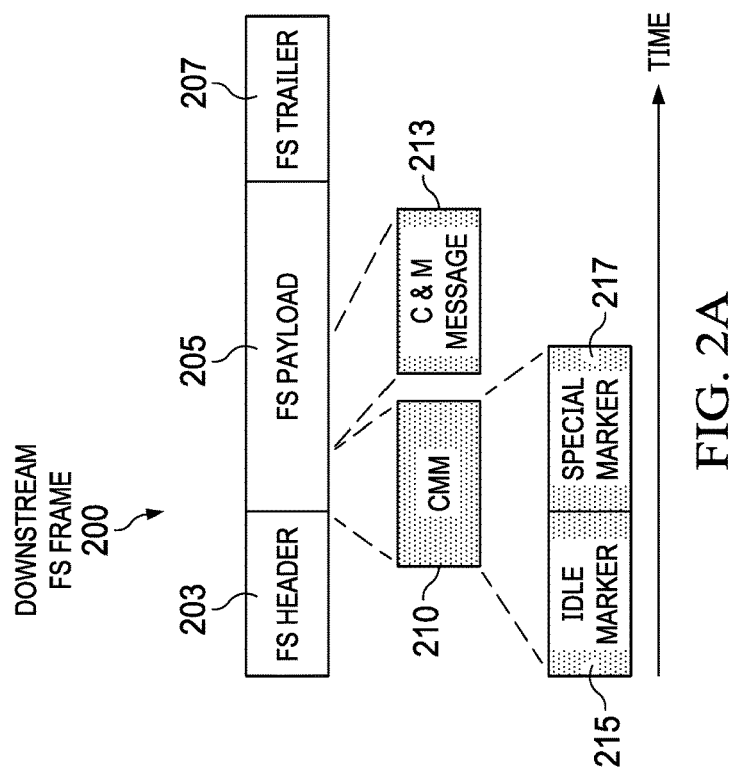
FIG. 2A is a schematic diagram of a downstream FS frame according to an embodiment of the disclosure.

FIG. 2A is a schematic diagram of a downstream FS frame 200 according to an embodiment of the disclosure. FIG. 2B is a schematic diagram of a downstream FS frame 220 according to another embodiment of the disclosure. The downstream FS frame 200 and the downstream FS frame 220 are similar, but are shown with different fields. The downstream FS frames 200, 220 are generated and communicated with respect to time as shown by a time arrow. The downstream FS frames 200, 220 may be communicated via a C&M channel such as a PLOAM channel or a dedicated C&M channel such as a dedicated PLOAM channel. The downstream FS frames 200, 220 may be in the same downstream data flow or may be in different downstream data flows.

The downstream FS frame 200 comprises an FS header 203, an FS payload 205, and an FS trailer 207. The FS header 203 is described below for the downstream FS frame 220. The FS payload 205 comprises data, for instance user data, that a source desires to transmit to a destination. In this case, the FS payload 205 comprises a CMM 210 and a C&M message 213. The FS trailer 207 comprises data, for instance FEC data, set at the discretion of the OLT 103.

The CMM 210 is at the beginning of the FS payload 205. Alternatively, the CMM 210 is at any other point in the FS payload 205, in the downstream FS frame 200, or elsewhere. The CMM 210 comprises an idle marker 215 and a special marker 217. The C&M message 213 is described below for FIG. 4. The C&M message 213 immediately follows the CMM 210 in the FS payload 205. Alternatively, the C&M message 213 is at any other point in the FS payload 205, in the downstream FS frame 200, or elsewhere. The MAC 105 may allocate sufficient space after the CMM 210 to accommodate the additional bits needed for the C&M message 213.

The idle marker 215 indicates that the downstream FS frame 200 is an idle frame. The special marker 217 indicates that the C&M message 213 will follow, when in time the C&M message 213 will follow, and how large the C&M message 213 will be. For instance, the special marker 217 indicates that the C&M message 213 will immediately follow in the FS payload 205 and will be 48 octets, or bytes. The special marker 217 may also indicate a C&M channel or a dedicated C&M channel.

The downstream FS frame 220 comprises an FS header 223, an FS payload 225, and an FS trailer 227. The FS header 223 comprises an HLend field 230, a BWmap 233, and a PLOAMd field 235. The FS payload 225 is similar to the FS payload 205, and the FS trailer 227 is similar to the FS trailer 207.

The HLend field 230 comprises a BWmap length 237, a PLOAM count field 240, and an HEC field 243. The BWmap 233 is a series of N 8-byte allocation structures 245-247, where each allocation structure 245-247 specifies a bandwidth allocation to a particular Alloc-ID. N is an unsigned integer. The PLOAMd field 235 is a C&M message. Alternatively, any other field in the FS header 223, in the downstream FS frame 220, or elsewhere is the C&M message. The PLOAMd field 235 is described below for FIGS. 3-4.

The BWmap length 237 contains an unsigned integer N indicating a number of allocation structures in the BWmap 233. The PLOAM count field 240 is a CMM. Specifically, the PLOAM count field 240 is a PLOAM marker that indicates that a C&M message will follow, when in time the C&M message will follow, and how large the C&M message will be. For instance, the PLOAM count field 240 indicates that the PLOAMd field 235 will follow in the FS header 223 and will be 48 octets. The PLOAM count field 240 may also indicate a C&M channel or a dedicated C&M channel. Alternatively, the CMM is another field in the HLend field 230, in the downstream FS frame 220, or elsewhere. The HEC field 243 is an error detection and correction field for the HLend field 230 and is a combination of a truncated BCH code operating on the 31 initial bits of the HLend field 230 and a single parity bit.

The allocation structure 1 245 comprises an Alloc-ID 250, a flags field 253, a StartTime 255, a GrantSize 257, an FWI field 260, a burst profile field 263, and an HEC field 265. The allocation structure N 247 is similar to the allocation structure 1 245. The ellipsis between the allocation structure 1 245 and the allocation structure N 247 indicates the presence of allocation structures 2 through N-1.

The Alloc-ID 250 contains a 14-bit number that indicates a recipient of a bandwidth allocation. The flags field 253 comprises a DBRu 267 and a PLOAMu field 270. The StartTime 255 contains a 16-bit number that indicates a location of a first byte of an upstream FS burst within an upstream PHY frame. The GrantSize 257 contains a 16-bit number that indicates a combined length of the FS payload 225 with DBRu 267 overhead transmitted within the given allocation. The FWI field 260 bit is set to 1 to expedite waking up of the ONU 127 or 143 that has been saving power. The burst profile field 263 is a 2-bit field that contains an index of a burst profile to be used by an adaptation layer of the ONU 127 or 143 to form a PHY burst. The HEC field 265 is a combination of a BCH code operating on the 63 initial bits of the allocation structure and a single parity bit.

The DBRu 267 is a single bit. If the bit is set to 1, then the ONU 127 or 143 should send a DBRu for the given Alloc-ID; if the bit is set to 0, then the ONU 127 or 143 should not send the DBRu. The PLOAMu field 270 is described below for FIG. 5B.

FIG. 3 is a PLOAMd field 300 according to an embodiment of the disclosure. The PLOAMd field 300 may be the PLOAMd field 235 in FIG. 2 and thus a C&M message. The C&M message 213 in FIG. 2 may be similar to the PLOAMd field 300. The PLOAMd field 300 contains oDSP-related C&M information and therefore implements oDSP-related C&M in the PON 100. The PLOAMd field 300 comprises an ONU-ID field 310 in octets 1-2, a message type ID field 320 in octet 3, a SeqNo field 330 in octet 4, a Message_Content field 340 in octets 5-40, and an MIC field 350 in octets 41-48.

The ONU-ID field 310 indicates whether the PLOAMd field 300 is a directed message to one ONU 127 or 143 or a broadcast message to all ONUs 127, 143. When the PLOAMd field 300 is a directed message, the value of the ONU-ID field 310 is either the ONU-ID of the ONU 127 or the ONU 143. When the PLOAMd field 300 is a broadcast message, the value of the ONU-ID field 310 is 0x03FF.

The message type ID field 320 indicates a type of oDSP-related downstream message, for instance a downstream C&M message. The message type is represented by a number in the format xx. The types of oDSP-related downstream messages are described below for FIG. 4.

The SeqNo field 330 indicates a sequence number that is used to ensure robustness of a PLOAM messaging channel. Specifically, the SeqNo field 330 is populated with a value of a corresponding OLT 103 sequence number counter. The OLT 103 maintains a separate sequence number counter for each ONU 127, 143 unicast and for a broadcast PLOAM message flow.

The Message_Content field 340 indicates information passed from the OLT 103 to the ONUs 127, 143 on oDSP-related C&M. The various types of information are described below for FIG. 4.

The MIC field 350 indicates an MIC that is used to verify the sender's identity and to prevent a forged PLOAM message attack.

FIG. 4 is a table 400 of downstream C&M messages 405-455 according to an embodiment of the disclosure. The table 400 comprises a message type ID column corresponding to the message type ID field 320 in the PLOAMd field 300 and indicating types of the downstream C&M messages 405-455 by a number in the format xx, a source column indicating sources of the downstream C&M messages 405-455, a destination column indicating destinations of the downstream C&M messages 405-455, and a vacation column indicating when the downstream C&M messages 405-455 are vacated if at all. The table 400 comprises a downstream C&M message 405 corresponding to message type ID 01, a downstream C&M message 410 corresponding to message type ID 02, a downstream C&M message 415 corresponding to message type ID 03, a downstream C&M message 420 corresponding to message type ID 04, a downstream C&M message 425 corresponding to message type ID 05, a downstream C&M message 430 corresponding to message type ID 06, a downstream C&M message 435 corresponding to message type ID 07, a downstream C&M message 440 corresponding to message type ID 08, a downstream C&M message 445 corresponding to message type ID 09, a downstream C&M message 450 corresponding to message type ID 10, and a downstream C&M message 455 corresponding to message type ID 11. As shown, the source of the downstream C&M messages 405-455 is the MAC 105 or the oDSP 107 in the OLT 103, the oDSP 137 in the ONU 127, or the oDSP 153 in the ONU 143. As also shown, the destination of the downstream C&M messages 405-455 is any combination of the oDSP 107 in the OLT 103, the oDSP 137 in the ONU 127, the oDSP 153 in the ONU 143, the MAC 140 in the ONU 127, or the MAC 155 in the ONU 143.

As a first example, the MAC 105 in the OLT 103 generates the downstream C&M message 405 and transmits the downstream C&M message 405 to the oDSP 107 in the OLT 103. After reading the downstream C&M message 405, the oDSP 107 may vacate, or remove, the downstream C&M message 405 and replace the downstream C&M message 405 with PRBS bits. The oDSP 107 may do so for a portion of the C&M message 405. For instance, the oDSP 107 vacates the Message_Content field 340 in the PLOAMd field 300 by changing bits in the Message_Content field 340 to 0 bits and replaces the 0 bits with PRBS bits. After the OLT 103 transmits the downstream FS frame 220 and the ONUs 127, 143 receive the downstream FS frame 220, the oDSPs 137, 153 in the ONUs 127, 143 may replace the PRBS bits with the downstream C&M message 455 and transmit the downstream C&M message 455 to the MACs 140, 155 in the ONUs 127, 143.

As a second example of processing downstream C&M messages 405-455 according to the table 400, the MAC 105 in the OLT 103 generates the downstream C&M message 420 and transmits the downstream C&M message 420 to the oDSP 107 in the OLT 103 and the oDSPs 137, 153 in the ONUs 127, 143. After reading the downstream C&M message 420, the oDSP 107 may not vacate the downstream C&M message 420 so that the oDSPs 137, 153 may also read the downstream C&M message 420.

The downstream C&M messages 405-455 may comprise any suitable information in the Message_Content field 340 of the PLOAMd field 300. As a first example of information in the Message_Content field 340, for the downstream C&M messages 405-410, 420-435, the Message_Content field 340 comprises oDSP configuration information. For instance, the oDSP configuration information comprises equalizer tap coefficients obtained from processing previous upstream bursts from the ONUs 127, 143 in order to provide better initial equalization coefficient setting of a current upstream burst, which results in faster equalizer convergence and better receiver sensitivity.

As a second example of information in the Message_Content field 340, for the downstream C&M messages 405-410, 420-435, the Message_Content field 340 comprises information that provides training through known preambles, which results in fast burst-mode equalization convergence.

As a third example of information in the Message_Content field 340, for the downstream C&M messages 405-410, 420-435, the Message_Content field 340 comprises burst power information. For instance, the burst power information indicates when subsequent upstream bursts will occur and which ONUs 127, 143 will transmit those upstream bursts, which facilitates burst-mode AGC.

As a fourth example of information in the Message_Content field 340, for the downstream C&M messages 405-410, the Message_Content field 340 comprises information related to DBA so that the oDSPs 107, 137, 153 know when a next upstream burst will arrive and from which ONU 127, 143 the next upstream burst will arrive from.

As a fifth example of information in the Message_Content field 340, for the downstream C&M messages 405-410, the Message_Content field 340 comprises FEC-related information. For instance, the FEC-related information specifies if the FEC is a soft-decision FEC or a hard-decision FEC. For instance, the FEC-related information specifies if puncturing or shortening applies to a given FEC code word.

As a sixth example of information in the Message_Content field 340, for the downstream C&M messages 405-410, the Message_Content field 340 comprises information related to a modulation symbol rate. The modulation symbol rate information may comprise a downstream modulation symbol rate assigned to an ONU 127, 143. The modulation symbol rate information may comprise an upstream modulation symbol rate assigned to an ONU 127, 143.

As a seventh example of information in the Message_Content field 340, for the downstream C&M messages 405-410, the Message_Content field 340 comprises information related to a modulation format. The modulation format may be NRZ or a type of PAM4.

As an eighth example of information in the Message_Content field 340, for the downstream C&M message 415, the Message_Content field 340 comprises oDSP-related information. The information may comprise a downstream signal data rate, a modulation format, or an FEC type.

As a ninth example of information in the Message_Content field 340, for the downstream C&M messages 440-455, the Message_Content field 340 comprises performance monitoring information for the oDSPs 137, 153, which results in improved performance.

As a tenth example of information in the Message_Content field 340, for the downstream C&M messages 440-455, the Message_Content field 340 comprises status information for the MACs 140, 155. The status information may include oDSP-related information for achieving better oDSP performance or better C&M.

For each of the downstream C&M messages 405-455, the source may also transmit a CMM, which is the PLOAM count field 240. In a similar manner, the source may transmit the CMM 210 and the C&M message 213. Though numbers 01-11 are shown for the message type ID column in the table 400, the downstream C&M messages 405-455 may correspond to any numbers available in the message type ID field 320 of the PLOAMd field 300.

Figure 5B:
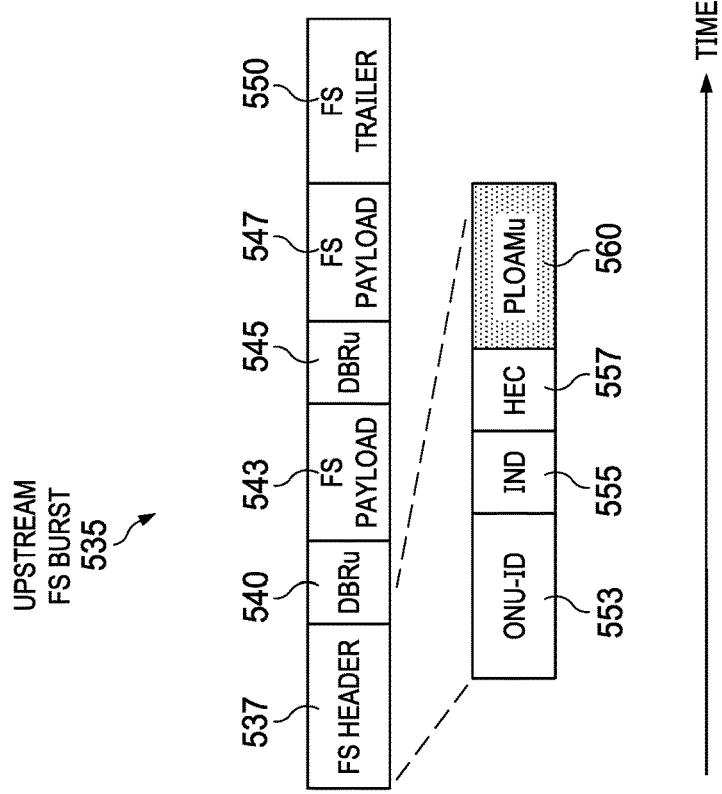
FIG. 5B is a schematic diagram of an upstream FS burst according to another embodiment of the disclosure.
Figure 5A:
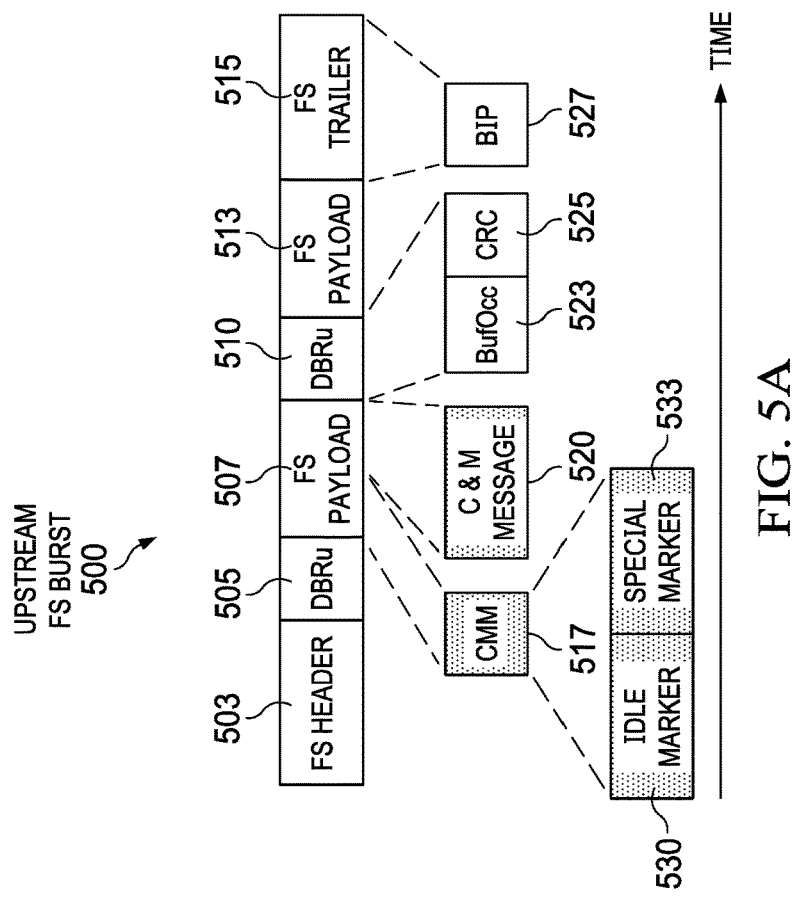
FIG. 5A is a schematic diagram of an upstream FS burst according to an embodiment of the disclosure.

FIG. 5A is a schematic diagram of an upstream FS burst 500 according to an embodiment of the disclosure. FIG. 5B is a schematic diagram of an upstream FS burst 535 according to another embodiment of the disclosure. The upstream FS burst 500 and the upstream FS burst 535 are similar, but are shown with different fields. The upstream FS bursts 500, 535 are generated and communicated with respect to time as shown by a time arrow. The upstream FS bursts 500, 535 may be communicated via a C&M channel such as a PLOAM channel or a dedicated C&M channel such as a dedicated PLOAM channel. The upstream FS bursts 500, 535 may be in the same upstream data flow or may be in different upstream data flows.

The upstream FS burst 500 comprises an FS header 503, a DBRu 505, an FS payload 507, a DBRu 510, an FS payload 513, and an FS trailer 515. The FS header 503 is described below for the upstream FS burst 535. The DBRu 505 comprises a buffer status report, which is associated with a specific Alloc-ID. The FS payload 507 comprises data, for instance user data, a source desires to transmit to a destination. In this case, the FS payload 507 comprises a CMM 517 and a C&M message 520. The DBRu 510 comprises a BufOcc 523 and a CRC 525. The FS payload 513 comprises data, for instance user data, a source desires to transmit to a destination. The FS trailer 515 comprises a BIP field 527.

The CMM 517 is at the beginning of the FS payload 507. Alternatively, the CMM 517 is at any other point in the FS payload 507 or the FS payload 513, in the upstream FS burst 500, or elsewhere. The CMM 517 comprises an idle marker 530 and a special marker 533. The C&M message 520 is described below for FIG. 7. The C&M message 520 immediately follows the CMM 517 in the FS payload 507. Alternatively, the C&M message 520 is at any other point in the FS payload 507 or the FS payload 513, in the upstream FS burst 500, or elsewhere. The MACs 140, 155 may allocate sufficient space after the CMM 517 to accommodate the additional bits needed for the C&M message 520.

The BufOcc 523 contains a total amount of SDU traffic aggregated across all buffers associated with an Alloc-ID to which a given allocation has been provided. The CRC 525 provides error detecting and correcting functions to protect the DBRu 505 and the DBRu 510.

The BIP field 527 comprises data computed over the entire upstream FS burst 500 that the OLT 103 verifies to estimate a BER on an upstream optical link.

The idle marker 530 indicates that the upstream FS burst 500 is an idle frame. The special marker 533 indicates that the C&M message 520 will follow, when in time the C&M message 520 will follow, and how large the C&M message 520 will be. For instance, the special marker 533 indicates that the C&M message 520 will immediately follow in the FS payload 507 and will be 48 octets. The special marker 533 may also indicate a C&M channel or a dedicated C&M channel.

The upstream FS burst 535 comprises an FS header 537, a DBRu 540, an FS payload 543, a DBRu 545, an FS payload 547, and an FS trailer 550. The FS header 537 comprises an ONU-ID 553, an Ind field 555, an HEC field 557, and a PLOAMu field 560. The DBRu 540 is similar to the DBRu 505, the FS payload 543 is similar to the FS payload 507, the DBRu 545 is similar to the DBRu 510, the FS payload 547 is similar to the FS payload 513, and the FS trailer 550 is similar to the FS trailer 515.

The ONU-ID 553 comprises a unique ONU-ID of the ONU 127, 143 that is transmitting the upstream FS burst 535. The Ind field 555 comprises signaling of the ONU 127, 143 status. The HEC field 557 is an error detection and correction field for the FS header 537 and is a combination of a truncated BCH code operating on the 31 initial bits of the FS header 537 and a single parity bit. The PLOAMu field 560 is a C&M message. Alternatively, any other field in the FS header 537, in the upstream FS burst 535, or elsewhere is the C&M message. The PLOAMu field 560 is described below for FIGS. 6-7.

The PLOAMu field 270 in FIG. 2B is a CMM. Specifically, the PLOAMu field 270 is a PLOAM marker that indicates that a C&M message will follow, when in time the C&M message will follow, and how large the C&M message will be. For instance, the PLOAMu field 270 indicates that the PLOAMu field 560 in FIG. 5B will follow in the upstream FS burst 535 and will be 48 octets. The PLOAMu field 270 may also indicate a C&M channel or a dedicated C&M channel. Alternatively, the CMM is another field in the flags field 253, in the downstream FS frame 220, or elsewhere. As an example, the OLT 103 transmits the downstream FS frame 220 to the ONU 127, the downstream FS frame 220 comprises the PLOAMu field 270 that indicates the PLOAMu field 560 will follow as a C&M message, the ONU 127 transmits the upstream FS burst 535 to the OLT 103, and the upstream FS burst 535 comprises the PLOAMu field 560. Thus, the PLOAMu field 270 may serve as an instruction for the ONU 127 to transmit the PLOAMu field 560 as a C&M message.

FIG. 6 is a PLOAMu field 600 according to an embodiment of the disclosure. The PLOAMu field 600 may be the PLOAMu field 560 in FIG. 5B and thus a C&M message. The C&M message may be similar to the PLOAMu field 600. The PLOAMu field 600 contains oDSP-related C&M information and therefore implements oDSP-related C&M in the PON 100. The PLOAMu field 600 comprises an ONU-ID field 610 in octets 1-2, a message type ID field 620 in octet 3, a SeqNo field 630 in octet 4, a Message_Content field 640 in octets 5-40, and an MIC field 650 in octets 41-48.

The ONU-ID field 610 indicates an ONU-ID of the message sender. For instance, if the ONU 127 sends the PLOAMu field 600, then the ONU-ID is 127. If the ONU 143 sends the PLOAMu field 600, then the ONU-ID is 143.

The message type ID field 620 indicates a type of oDSP-related upstream message, for instance an upstream C&M message. The message type is represented by a number in the format yy. The types of oDSP-related upstream messages are described below for FIG. 7.

The SeqNo field 630 indicates a sequence number that is used to ensure robustness of a PLOAM messaging channel. Specifically, when the PLOAMu field 600 is in response to the PLOAMd field 300, the content of the SeqNo field 630 in the PLOAMu field 600 is equal to the content of the SeqNo field 330 in the PLOAMd field 300. When the PLOAMu field 600 is originated autonomously by the ONU 127, 143, the value SeqNo=0 is used.

The Message_Content field 640 indicates information passed from the ONU 127, 143 to the OLT 103 on oDSP-related C&M. The various types of information are described below for FIG. 7.

The MIC field 650 indicates an MIC that is used to verify the sender's identity and to prevent a forged PLOAM message attack.

FIG. 7 is a table 700 of upstream C&M messages 705-755 according to an embodiment of the disclosure. The table 700 comprises a message type ID column corresponding to the message type ID field 620 in the PLOAMu field 600 and indicating types of upstream C&M messages 705-755 by a number in the format yy, a source column indicating sources of the upstream C&M messages 705-755, a destination column indicating destinations of the upstream C&M messages 705-755, and a vacation column indicating when the upstream C&M messages 705-755 are vacated if at all. The table 700 comprises an upstream C&M message 705 corresponding to message type ID 01, an upstream C&M message 710 corresponding to message type ID 02, an upstream C&M message 715 corresponding to message type ID 03, an upstream C&M message 720 corresponding to message type ID 04, an upstream C&M message 725 corresponding to message type ID 05, an upstream C&M message 730 corresponding to message type ID 06, an upstream C&M message 735 corresponding to message type ID 07, an upstream C&M message 740 corresponding to message type ID 08, an upstream C&M message 745 corresponding to message type ID 09, an upstream C&M message 750 corresponding to message type ID 10, and an upstream C&M message 755 corresponding to message type ID 11. As shown, the source of the upstream C&M messages 705-755 is the MAC 140 in the ONU 127, the MAC 155 in the ONU 143, the oDSP 137 in the ONU 127, the oDSP 153 in the ONU 143, or the oDSP 107 in the OLT 103. As also shown, the destination of the upstream C&M messages 705-755 is any combination of the oDSP 137 in the ONU 127, the oDSP 153 in the ONU 143, the oDSP 107 in the OLT 103, or the MAC 105 in the OLT 103.

As a first example of processing the upstream C&M messages 705-755 according to the table 700, the MAC 140 in the ONU 127 generates the upstream C&M message 705 and transmits the upstream C&M message 705 to the oDSP 137 in the ONU 127. After reading the upstream C&M message 705, the oDSP 137 may vacate the upstream C&M message 705 and replace the upstream C&M message 705 with PRBS bits. The oDSP 137 may do so for a portion of the C&M message 705. For instance, the oDSP 137 vacates the Message_Content field 640 in the PLOAMu field 600 by changing bits in the Message_Content field 640 to 0 bits and replaces the 0 bits with PRBS bits. After the ONU 127 transmits the upstream FS burst 535 and the OLT 103 receives the upstream FS burst 535, the oDSPs 107 in the OLT 103 may replace the PRBS bits with the upstream C&M message 755 and transmit the upstream C&M message 755 to the MAC 105 in the OLT 103.

As a second example of processing the upstream C&M messages 705-755 according to the table 700, the MAC 140 in the ONU 127 generates the upstream C&M message 720 and transmits the upstream C&M message 720 to the oDSP 137 in the ONU 127 and the oDSP 107 in the OLT 103. After reading the upstream C&M message 720, the oDSP 137 may not vacate the upstream C&M message 720 so that the oDSP 107 may also read the upstream C&M message 720.

The upstream C&M messages 705-755 may comprise any suitable information in the Message_Content field 640 of the PLOAMu field 600. As a first example of information in the Message_Content field 640, for the upstream C&M messages 705-710, 720-735, the Message_Content field 640 comprises oDSP configuration information. For instance, the configuration information is for better equalization coefficient setting, which results in better receiver sensitivity.

As a second example of information in the Message_Content field 640, for the upstream C&M messages 705-710, 720-735, the Message_Content field 640 comprises information that provides training through known preambles, which results in fast burst-mode equalization convergence.

As a third example of information in the Message_Content field 640, for the upstream C&M messages 705-710, 720-735, the Message_Content field 640 comprises burst power information. For instance, the burst power information indicates when subsequent upstream bursts will occur and which ONUS 127, 143 will transmit those upstream bursts, which facilitates burst-mode AGC.

As a fourth example of information in the Message_Content field 640, for the upstream C&M messages 705-755, the Message_Content field 640 comprises information related to DBA so that the oDSPs 107, 137, 153 know when a next upstream burst will be sent to the OLT 103.

As a fifth example of information in the Message_Content field 640, for the upstream C&M messages 705-755, the Message_Content field 640 comprises FEC-related information. For instance, the FEC-related information specifies if the FEC is a soft-decision FEC or a hard-decision FEC. For instance, the FEC-related information specifies if puncturing or shortening applies to a given FEC code word.

As a sixth example of information in the Message_Content field 640, for the upstream C&M messages 705-755, the Message_Content field 640 comprises information related to a modulation symbol rate. The modulation symbol rate information may comprise a downstream modulation symbol rate assigned to an ONU 127, 143. The modulation symbol rate information may comprise an upstream modulation symbol rate assigned to an ONU 127, 143.

As a seventh example of information in the Message_Content field 640, for the upstream C&M messages 705-755, the Message_Content field 640 comprises information related to a modulation format. The modulation format may be NRZ or modulation type of PAM4.

As an eighth example of information in the Message_Content field 640, for the upstream C&M message 715, the Message_Content field 640 comprises oDSP-related information. The information may comprise an upstream signal data rate, a modulation format, or an FEC type.

As a ninth example of information in the Message_Content field 640, for the upstream C&M messages 740-755, the Message_Content 640 field comprises performance monitoring information for the oDSP 107, which results in improved performance.

As a tenth example of information in the Message_Content field 640, for the upstream C&M messages 740-755, the Message_Content field 640 comprises status information for the MAC 105. The status information may include oDSP-related information for achieving better oDSP performance or better C&M.

For each of the upstream C&M messages 705-755, the source may also transmit a CMM, which is the PLOAMu field 270 in FIG. 2B. In a similar manner, the source may transmit the CMM 517 and the C&M message 520. Though numbers 01-11 are shown for the message type ID column in the table 700, the upstream C&M messages 705-755 may correspond to any numbers available in the message type ID field 620 of the PLOAMu field 600.

Figure 8:
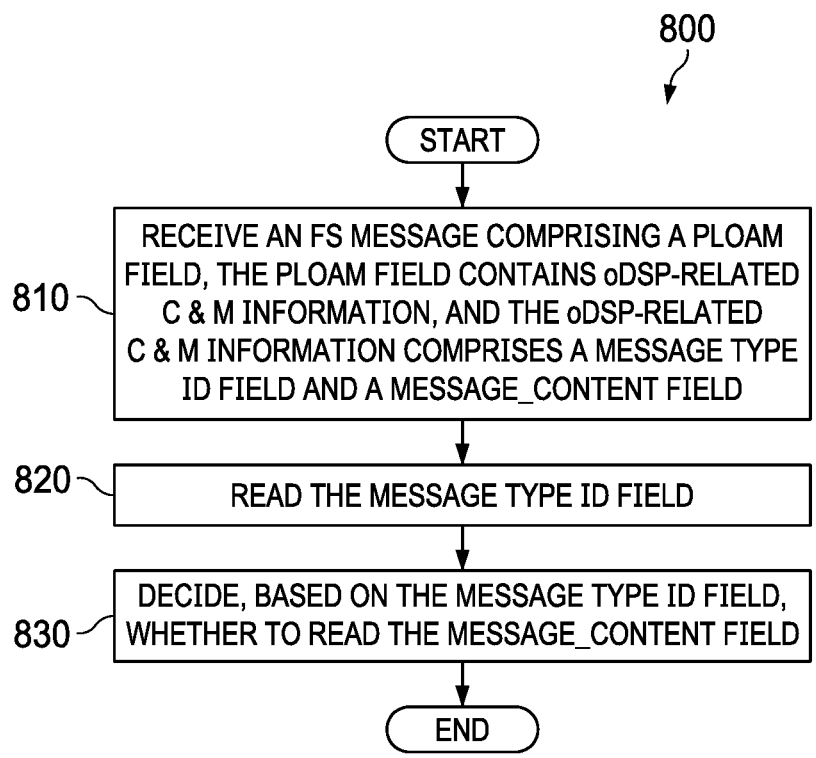
FIG. 8 is a flowchart illustrating a method of processing a PLOAM field according to an embodiment of the disclosure.

FIG. 8 is a flowchart illustrating a method 800 of processing a PLOAM field according to an embodiment of the disclosure. At step 810, an FS message comprising a PLOAM field is received. The PLOAM field contains oDSP-related C&M information. The oDSP-related C&M information comprises a message type ID field and a Message_Content field. For instance, the oDSP 107 receives the downstream FS frame 220 from the MAC 105, the downstream FS frame 220 comprises the PLOAMd field 235 as embodied by the PLOAMd field 300, and the C&M information comprises the message type ID field 320 and the Message_Content field 340 in the PLOAMd field 300. Alternatively, the oDSP 137 receives the upstream FS burst 535 from the MAC 140, the upstream FS burst 535 comprises the PLOAMu field 560 as embodied in the PLOAMu field 600, and the C&M information comprises the message type ID field 620 and the Message_Content field 640 in the PLOAMu field 600. At step 820, the message type ID field is read. Finally, at step 830, it is decided, based on the message type ID field, whether to read the Message_Content field. For instance, if the oDSP 107 receives the downstream FS frame 220 from the MAC 105 and the message type ID field 320 in the PLOAMd field 300 indicates the PLOAMd field 300 is the C&M message 405, then the oDSP 107 decides to read the Message_Content field 340. If the oDSP 107 receives the downstream FS frame 220 from the MAC 105 and the message type ID field 320 in the PLOAMd field 300 indicates the PLOAMd field 300 is the C&M message 410, then the oDSP 107 decides not to read the Message_Content field 340. The latter message is intended for the oDSP 137 in the ONU 127 or the oDSP 153 in the ONU 143.

For the method 800, the Message_Content field may be removed to create a modified PLOAM field. For instance, bits in the Message_Content field 340 or 640 are changed to 0 bits to create a modified PLOAMd field 300 or PLOAMu field 600. The modified FS frame may be transmitted. For instance, the OLT 103 transmits the modified PLOAMd field 300 in the downstream FS frame 220 to the ONU 127. Alternatively, the ONU 127 transmits the modified PLOAMu field 600 in upstream FS burst 535 to the OLT 103.

Figure 9:
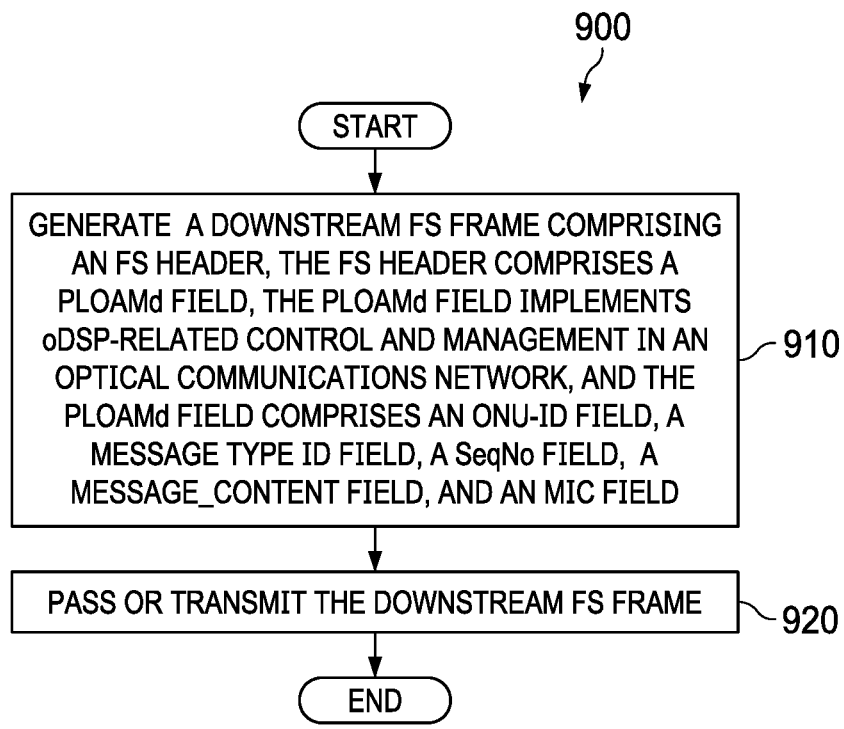
FIG. 9 is a flowchart illustrating a method of communicating a downstream FS frame according to an embodiment of the disclosure.

FIG. 9 is a flowchart illustrating a method 900 of communicating a downstream FS frame according to an embodiment of the disclosure. At step 910, a downstream FS frame comprising an FS header is generated. The FS header comprises a PLOAMd field; the PLOAMd field implements oDSP-related control and management in an optical communications network; and the PLOAMd field comprises an ONU-ID field, a message type ID field, a SeqNo field, a Message_Content field, and an MIC field. For instance, the MAC 105 or the oDSP 107 generates the downstream FS frame 220 comprising the FS header 223. The FS header 223 comprises the PLOAMd field 235, and the PLOAMd field 235 comprises the ONU-ID field 310, the message type ID field 320, the SeqNo field 330, the Message_Content field 340, and the MIC field 350 in FIG. 3. Finally, at step 920, the downstream FS frame is passed or transmitted. For instance, the MAC 105 transmits the downstream FS frame 220 to the oDSP 107, or the OLT 103 transmits the downstream FS frame 220 to the ONU 127.

Figure 10:
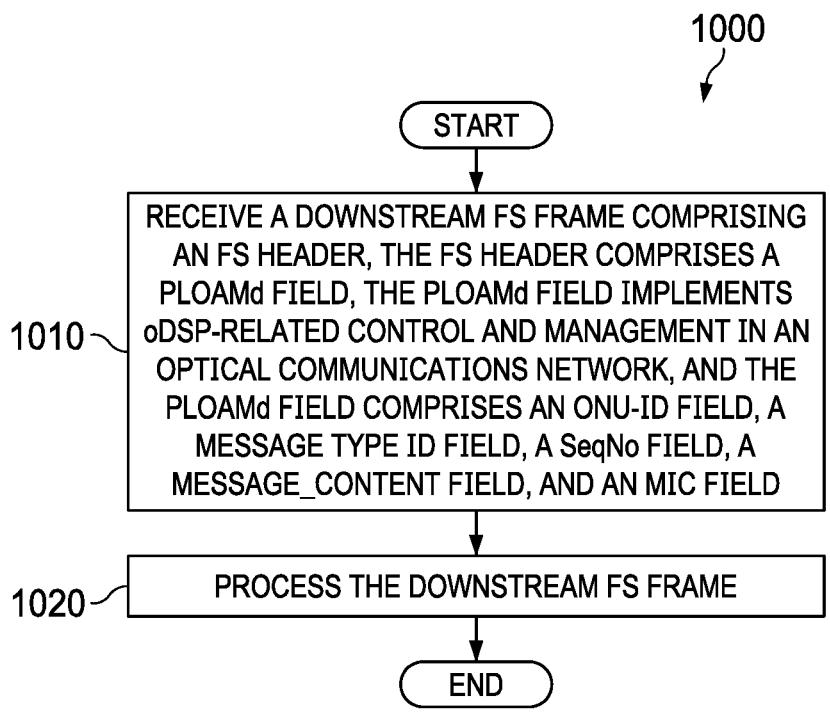
FIG. 10 is a flowchart illustrating a method of receiving a downstream FS frame according to an embodiment of the disclosure.

FIG. 10 is a flowchart illustrating a method 1000 of receiving a downstream FS frame according to an embodiment of the disclosure. At step 1010, a downstream FS frame comprising an FS header is received. The FS header comprises a PLOAMd field; the PLOAMd field implements oDSP-related control and management in an optical communications network; and the PLOAMd field comprises an ONU-ID field, a message type ID field, a SeqNo field, a Message_Content field, and an MIC field. For instance, the oDSP 137 receives from the OLT 103 the downstream FS frame 220 comprising the FS header 223. The FS header 223 comprises the PLOAMd field 235, and the PLOAMd field 235 comprises the ONU-ID field 310, the message type ID field 320, the SeqNo field 330, the Message_Content field 340, and the MIC field 350 in FIG. 3. Finally, at step 1020, the downstream FS frame is processed. For instance, the oDSP 137 configures itself based on the downstream FS frame 220.

Figure 11:
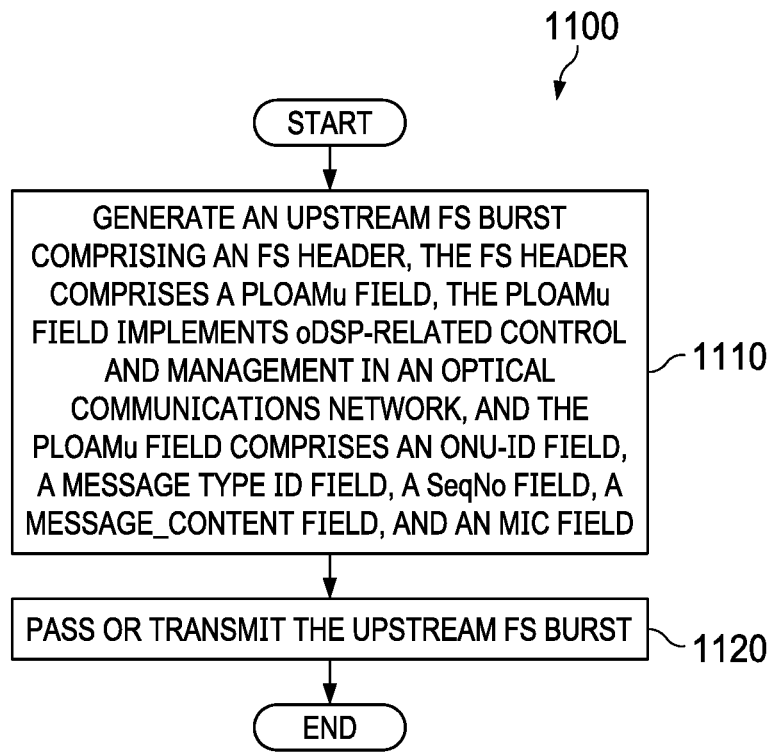
FIG. 11 is a flowchart illustrating a method of communicating an upstream FS burst according to an embodiment of the disclosure.

FIG. 11 is a flowchart illustrating a method 1100 of communicating an upstream FS burst according to an embodiment of the disclosure. At step 1110, an upstream FS burst comprising an FS header is generated. The FS header comprises a PLOAMu field; the PLOAMu field implements oDSP-related control and management in an optical communications network; and the PLOAMu field comprises an ONU-ID field, a message type ID field, a SeqNo field, a Message_Content field, and an MIC field. For instance, the MAC 140 or the oDSP 137 generates the upstream FS burst 535 comprising the FS header 537. The FS header 537 comprises the PLOAMu field 560, and the PLOAMu field 560 comprises the ONU-ID field 610, the message type ID field 620, the SeqNo field 630, the Message_Content field 640, and the MIC field 650 in FIG. 6. Finally, at step 1120, the upstream FS burst is passed or transmitted. For instance, the MAC 140 transmits the upstream FS burst 535 to the oDSP 137, or the ONU 127 transmits the upstream FS burst 535 to the OLT 103.

Figure 12:
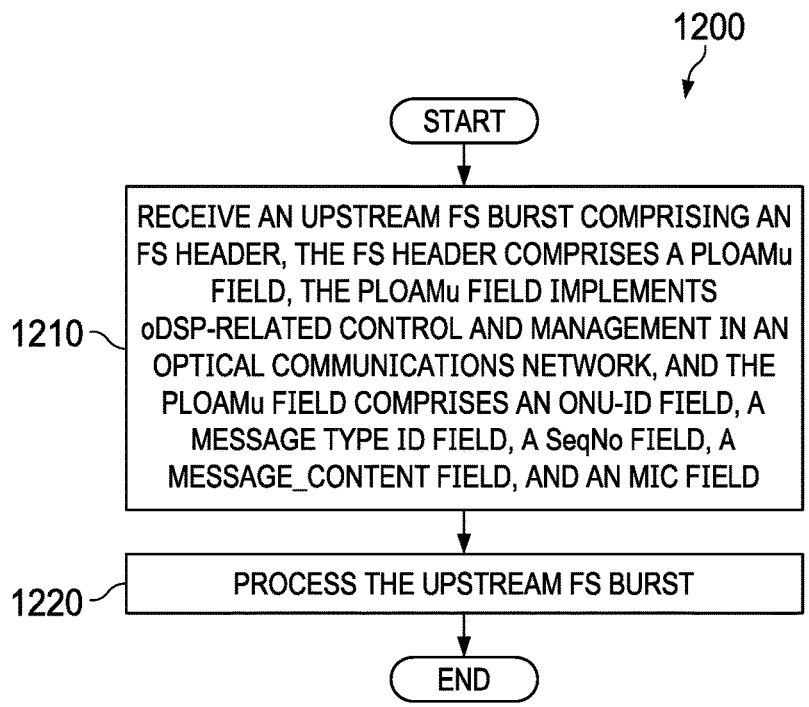
FIG. 12 is a flowchart illustrating a method of receiving an upstream FS burst according to an embodiment of the disclosure.

FIG. 12 is a flowchart illustrating a method 1200 of receiving an upstream FS burst according to an embodiment of the disclosure. At step 1210, an upstream FS burst comprising an FS header is received. The FS header comprises a PLOAMu field; the PLOAMu field implements oDSP-related control and management in an optical communications network; and the PLOAMu field comprises an ONU-ID field, a message type ID field, a SeqNo field, a Message_Content field, and an MIC field. For instance, the oDSP 107 receives from the ONU 127 the upstream FS burst 535 comprising the FS header 537. The FS header 537 comprises the PLOAMu field 560, and the PLOAMu field 560 comprises the ONU-ID field 610, the message type ID field 620, the SeqNo field 630, the Message_Content field 640, and the MIC field 650 in FIG. 6. Finally, at step 1220, the upstream FS burst is processed. For instance, the oDSP 107 configures itself based on the upstream FS burst 535.

Figure 13:
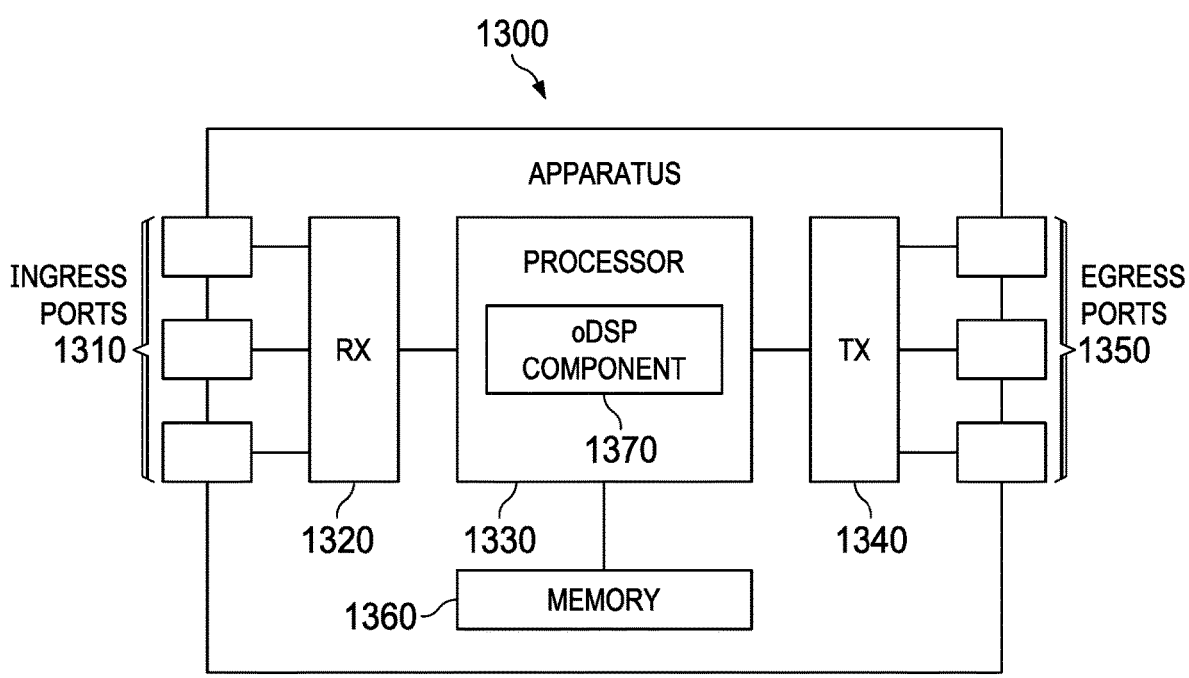
FIG. 13 is a schematic diagram of an apparatus according to an embodiment of the disclosure.

FIG. 13 is a schematic diagram of an apparatus 1300 according to an embodiment of the disclosure. The apparatus 1300 may implement the disclosed embodiments. The apparatus 1300 comprises ingress ports 1310 and an RX 1320 to receive data; a processor, logic unit, baseband unit, or CPU 1330 to process the data; a TX 1340 and egress ports 1350 to transmit the data; and a memory 1360 to store the data. The apparatus 1300 may also comprise OE components, EO components, or RF components coupled to the ingress ports 1310, the RX 1320, the TX 1340, and the egress ports 1350 to provide ingress or egress of optical signals, electrical signals, or RF signals.

The processor 1330 is any combination of hardware, middleware, firmware, or software. The processor 1330 comprises any combination of one or more CPU chips, cores, FPGAs, ASICs, or DSPs. The processor 1330 communicates with the ingress ports 1310, the RX 1320, the TX 1340, the egress ports 1350, and the memory 1360. The processor 1330 comprises an oDSP component 1370, which implements the disclosed embodiments. For instance, the oDSP component 1370 implements any combination of the MACs 105, 140, 155 and the oDSPs 107, 137, 153. The inclusion of the oDSP component 1370 therefore provides a substantial improvement to the functionality of the apparatus 1300 and effects a transformation of the apparatus 1300 to a different state. Alternatively, the memory 1360 stores the oDSP component 1370 as instructions, and the processor 1330 executes those instructions.

The memory 1360 comprises any combination of disks, tape drives, or solid-state drives. The apparatus 1300 may use the memory 1360 as an over-flow data storage device to store programs when the apparatus 1300 selects those programs for execution and to store instructions and data that the apparatus 1300 reads during execution of those programs. The memory 1360 may be volatile or non-volatile and may be any combination of ROM, RAM, TCAM, or SRAM.

A computer program product may comprise computer-executable instructions stored on a non-transitory medium, for instance the memory 1360, that when executed by a processor, for instance the processor 1330, cause an apparatus to perform any of the embodiments.

A first apparatus is in an optical communications network. The first apparatus comprises a transmitter element; a receiver element; a first MAC element; and a first oDSP element coupled to the transmitter element, the receiver element, and the first MAC element and configured to communicate a message via a dedicated C&M channel with at least one of the first MAC element, a second MAC element in a second apparatus in the optical communications network, or a second oDSP element in the second apparatus.

In an example embodiment, the apparatus 1300 includes a reception module receiving an FS message comprising a PLOAM field, the PLOAM field contains oDSP-related C&M information, and the oDSP-related C&M information comprises a message type ID field and a Message_Content field, a read module reading the message type ID field, and a decision module deciding, based on the message type ID field, whether to read the Message_Content field. In some embodiments, the apparatus 1300 may include other or additional modules for performing any one of or combination of steps described in the embodiments. Further, any of the additional or alternative embodiments or aspects of the method, as shown in any of the figures or recited in any of the claims, are also contemplated to include similar modules.

In an example embodiment, the apparatus 1300 includes a frame generation module generating a downstream FS frame comprising an FS header, the FS header comprises a PLOAMd field, the PLOAMd field implements oDSP-related C&M in an optical communications network, and the PLOAMd field comprises an ONU-ID field, a message type ID field, a SeqNo field, a Message_Content field, and an MIC field, and a transmission module transmitting the downstream FS frame. In some embodiments, the apparatus 1300 may include other or additional modules for performing any one of or combination of steps described in the embodiments. Further, any of the additional or alternative embodiments or aspects of the method, as shown in any of the figures or recited in any of the claims, are also contemplated to include similar modules.

In an example embodiment, the apparatus 1300 includes a reception module receiving a downstream FS frame comprising an FS header, the FS header comprises a PLOAMd field, the PLOAMd field implements oDSP-related C&M in an optical communications network, and the PLOAMd field comprises an ONU-ID field, a message type ID field, a SeqNo field, a Message_Content field, and an MIC field, and a process module processing the downstream FS frame. In some embodiments, the apparatus 1300 may include other or additional modules for performing any one of or combination of steps described in the embodiments. Further, any of the additional or alternative embodiments or aspects of the method, as shown in any of the figures or recited in any of the claims, are also contemplated to include similar modules.

In an example embodiment, the apparatus 1300 includes a burst generation module. generating an upstream FS burst comprising an FS header, the FS header comprises a PLOAMu field, the PLOAMu field implements oDSP-related C&M in an optical communications network, and the PLOAMu field comprises an ONU-ID field, a message type ID field, a SeqNo field, a Message_Content field, and an MIC field, and a transmission module transmitting the upstream FS burst. In some embodiments, the apparatus 1300 may include other or additional modules for performing any one of or combination of steps described in the embodiments. Further, any of the additional or alternative embodiments or aspects of the method, as shown in any of the figures or recited in any of the claims, are also contemplated to include similar modules.

In an example embodiment, the apparatus 1300 includes a reception module receiving an upstream FS burst comprising an FS header, the FS header comprises a PLOAMu field, the PLOAMu field implements oDSP-related control and management in an optical communications network, and the PLOAMu field comprises an ONU-ID field, a message type ID field, a SeqNo field, a Message_Content field, and an MIC field, and a process module processing the upstream FS burst. In some embodiments, the apparatus 1300 may include other or additional modules for performing any one of or combination of steps described in the embodiments. Further, any of the additional or alternative embodiments or aspects of the method, as shown in any of the figures or recited in any of the claims, are also contemplated to include similar modules.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A first apparatus in an optical communications network, the first apparatus comprising:
   a transmitter;
   a receiver;
   a first media access controller (MAC); and
   a first digital signal processor for optical signal (oDSP) coupled to the transmitter, to the receiver, and to the first MAC, the first digital signal processor being configured to communicate a message via a dedicated control and management (C&M) channel with at least one of the first MAC, a second MAC in a second apparatus in the optical communications network, or a second oDSP in the second apparatus.

2. The first apparatus of claim 1, wherein the optical communications network is a passive optical network (PON), the first apparatus is an optical line terminal (OLT), and the second apparatus is an optical network unit (ONU).

3. The first apparatus of claim 1, wherein the optical communications network is a passive optical network (PON), the first apparatus is an optical network unit (ONU), and the second apparatus is an optical line terminal (OLT).

4. The first apparatus of claim 1, wherein the dedicated C&M channel is a physical layer operations, administration, and maintenance (PLOAM) channel.

5. The first apparatus of claim 1, wherein the first oDSP is further configured to:
generate the message; and
transmit the message to the first MAC.

6. The first apparatus of claim 1, wherein the first oDSP is further configured to generate the message, and wherein the transmitter is configured to transmit the message to at least one of the second MAC or the second oDSP.

7. The first apparatus of claim 1, wherein the first oDSP is further configured to:
receive the message; and
process the message.

8. The first apparatus of claim 1, wherein the message is a C&M message that implements digital signal processing for optical signal (oDSP)-related C&M.

9. The first apparatus of claim 1, wherein the first oDSP is further configured to communicate a C&M marker (CMM) indicating the dedicated C&M channel.

10. The first apparatus of claim 9, wherein the message is a C&M message and the CMM indicates the C&M message will follow, indicates when in time the C&M message will follow, and indicates how large the C&M message will be.

11. The first apparatus of claim 9, wherein the CMM is in an idle frame.

12. The first apparatus of claim 11, wherein the CMM further indicates the idle frame.

13. A method comprising:
receiving a framing sublayer (FS) message comprising a physical layer operations, administration, and maintenance (PLOAM) field, the PLOAM field contains digital signal processing for optical signal (oDSP)-related control and management (C&M) information, and the oDSP-related C&M information comprises a message type identifier (ID) field and a Message_Content field;
reading the message type ID field; and
deciding, based on the message type ID field, whether to read the Message_Content field.

14. The method of claim 13, further comprising:
removing the Message_Content field to create a modified PLOAM field; and
transmitting the modified PLOAM field.

15. The method of claim 14, wherein the PLOAM field is a PLOAM downstream (PLOAMd) field from a media access controller (MAC) in an optical line terminal (OLT) to a digital signal processor for optical signal (oDSP) in the OLT, and wherein the modified PLOAM field is a modified PLOAMd field from the OLT to an optical network unit (ONU).

16. The method of claim 14, wherein the PLOAM field is a PLOAM upstream (PLOAMu) field from a media access controller (MAC) in an optical network unit (ONU) to a digital signal processor for optical signal (oDSP) in the ONU, and wherein the modified PLOAM field is a modified PLOAMu field from the ONU to an optical line terminal (OLT).

17. A method comprising:
generating a downstream framing sublayer (FS) frame comprising an FS header, the FS header comprises a physical layer operations, administration, and maintenance, downstream (PLOAMd) field, the PLOAMd field implements digital signal processing for optical signal (oDSP)-related control and management in an optical communications network, and the PLOAMd field comprises an optical network unit identifier (ONU-ID) field, a message type identifier (ID) field, a sequence number (SeqNo) field, a Message_Content field, and a message integrity check (MIC) field; and
transmitting the downstream FS frame.

18. A method comprising:
receiving a downstream framing sublayer (FS) frame comprising an FS header, the FS header comprises a physical layer operations, administration, and maintenance, downstream (PLOAMd) field, the PLOAMd field implements digital signal processing for optical signal (oDSP)-related control and management in an optical communications network, and the PLOAMd field comprises an optical network unit identifier (ONU-ID) field, a message type identifier (ID) field, a sequence number (SeqNo) field, a Message_Content field, and a message integrity check (MIC) field; and
processing the downstream FS frame.

19. A method comprising:
generating an upstream framing sublayer (FS) burst comprising an FS header, the FS header comprises a physical layer operations, administration, and maintenance, upstream (PLOAMu) field, the PLOAMu field implements digital signal processing for optical signal (oDSP)-related control and management in an optical communications network, and the PLOAMu field comprises an optical network unit identifier (ONU-ID) field, a message type identifier (ID) field, a sequence number (SeqNo) field, a Message_Content field, and a message integrity check (MIC) field; and
transmitting the upstream FS burst.

20. A method comprising:
receiving an upstream framing sublayer (FS) burst comprising an FS header, the FS header comprises a physical layer operations, administration, and maintenance, upstream (PLOAMu) field, the PLOAMu field implements optical digital signal processing for optical signal (oDSP)-related control and management in an optical communications network, and the PLOAMu field comprises an optical network unit identifier (ONU-ID) field, a message type identifier (ID) field, a sequence number (SeqNo) field, a Message_Content field, and a message integrity check (MIC) field; and
processing the upstream FS burst.

* * * * *